US012586356B2

(12) United States Patent
Dalborgo et al.

(10) Patent No.: US 12,586,356 B2
(45) Date of Patent: Mar. 24, 2026

(54) ARTIFICIAL IMAGE GENERATION WITH TRAFFIC SIGNS

(71) Applicant: Ford Global Technologies, LLC, Dearborn, MI (US)

(72) Inventors: Vanessa Ferreira Dalborgo, Salvador (BR); João Gabriel Lima Moraes, Feira de Santana (BR); Vinicius Souza Madureira, Ilhéus (BR); Vitor Magno De Oliveira Santos Bezerra, Sergipe (BR)

(73) Assignee: Ford Global Technologies, LLC, Dearborn, MI (US)

( * ) Notice: Subject to any disclaimer, the term of this patent is extended or adjusted under 35 U.S.C. 154(b) by 429 days.

(21) Appl. No.: 18/163,324

(22) Filed: Feb. 2, 2023

(65) Prior Publication Data

US 2024/0265675 A1    Aug. 8, 2024

(51) Int. Cl.
G06V 10/774        (2022.01)
G06V 10/772        (2022.01)
G06V 20/58        (2022.01)

(52) U.S. Cl.
CPC .......... G06V 10/774 (2022.01); G06V 10/772 (2022.01); G06V 20/582 (2022.01)

(58) Field of Classification Search
CPC .. G06V 10/774; G06V 10/772; G06V 20/582; G06V 10/25; G06V 10/26; G06V 10/82; G06V 20/70
See application file for complete search history.

(56) References Cited

U.S. PATENT DOCUMENTS

| | | | |
|---|---|---|---|
| 9,767,371 B2 | 9/2017 | Ai et al. | |
| 10,807,805 B2 | 10/2020 | Clucas et al. | |
| 11,120,309 B2 | 9/2021 | Inoue | |
| 11,205,099 B2 | 12/2021 | Shlens et al. | |
| 11,887,475 B1* | 1/2024 | Riggs ................. | G08G 1/09623 |
| 2018/0285663 A1* | 10/2018 | Viswanathan ......... | G06V 20/63 |
| 2020/0050443 A1 | 2/2020 | Edelsten et al. | |
| 2020/0050935 A1 | 2/2020 | Edelsten et al. | |
| 2020/0050945 A1* | 2/2020 | Chen ........................ | G06N 3/09 |
| 2020/0410288 A1* | 12/2020 | Capota ................ | G06F 21/6245 |
| 2022/0292750 A1* | 9/2022 | Pinel ...................... | G06N 20/00 |
| 2023/0077082 A1* | 3/2023 | Liu .................... | G01C 21/3837 |

FOREIGN PATENT DOCUMENTS

| | | | | |
|---|---|---|---|---|
| CN | 111259818 A | 6/2020 | | |
| CN | 113191255 A | 7/2021 | | |
| CN | 113435273 A | 9/2021 | | |
| CN | 113963333 A | 1/2022 | | |
| DE | 102019209560 A1 * | 12/2020 | .......... | G06V 20/582 |
| DE | 102020110243 A1 | 10/2021 | | |
| DE | 102021208726 A1 * | 2/2023 | | |
| EP | 3621040 A1 | 3/2020 | | |

* cited by examiner

*Primary Examiner* — Jennifer Mehmood
*Assistant Examiner* — Vaisali Rao Koppolu
(74) *Attorney, Agent, or Firm* — Christopher Storms Brooks Kushman P.C.

(57) ABSTRACT

A computer includes a processor and a memory, and the memory stores instructions executable by the processor to receive a plurality of initial images including traffic signs, identify the traffic signs in the initial images, and generate new images by applying manipulations to the traffic signs in the initial images. The manipulations simulate physical changes to the traffic signs.

20 Claims, 6 Drawing Sheets

ARTIFICIAL IMAGE GENERATION WITH TRAFFIC SIGNS

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more images sensors that can be processed to determine locations of objects. Object location data extracted from images can be used by a computer to operate systems including vehicles, robots, security, and object-tracking systems. Machine-learning algorithms can be used on board vehicles to operate advanced driver assistance systems (ADAS) and/or operate vehicle components based on detecting objects in images, e.g., taken by cameras on board vehicles as the vehicles are driving.

DETAILED DESCRIPTION

Figures 1, 2:
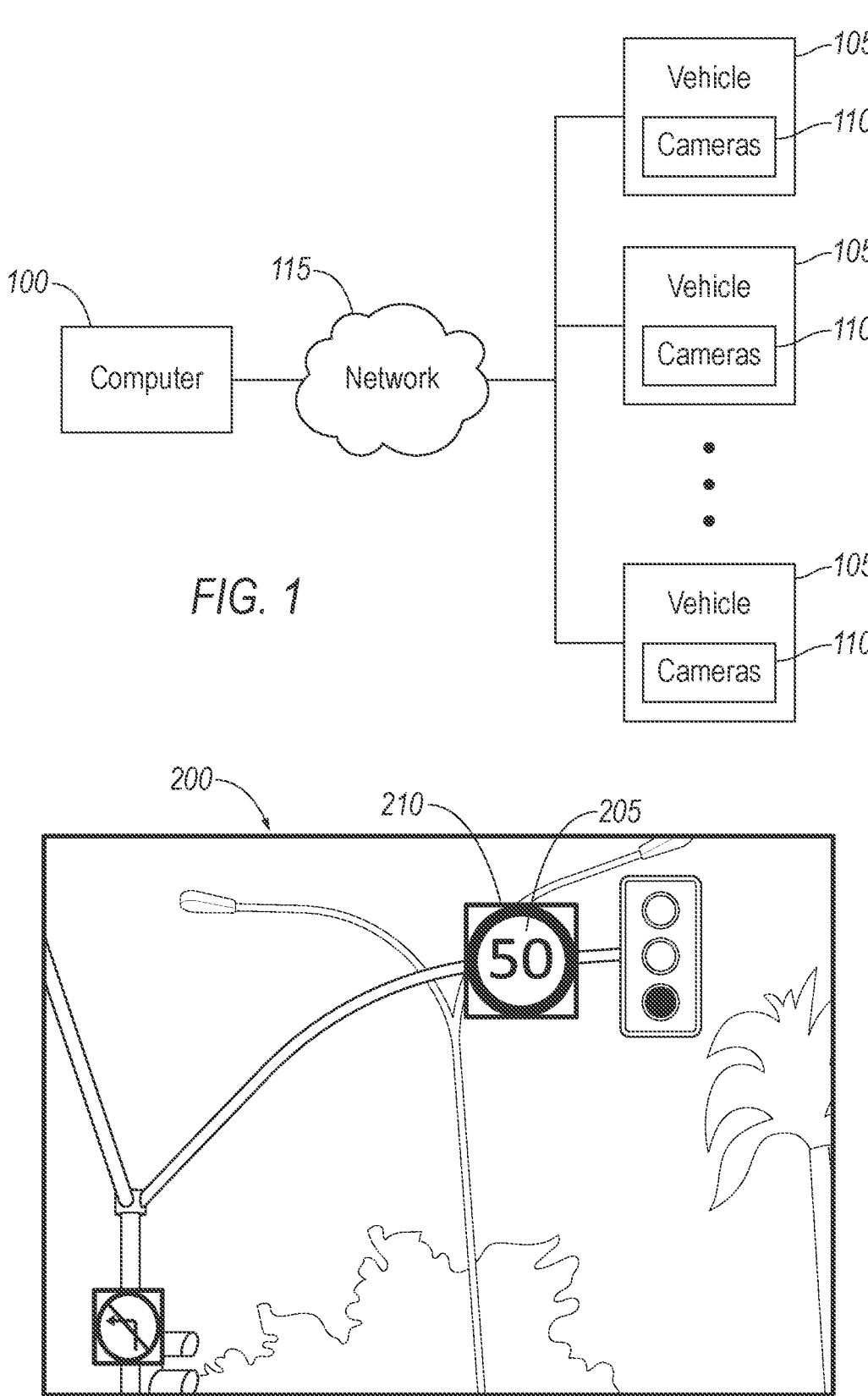
FIG. 1 is a block diagram of example images collecting image data.
FIG. 2 is a representation of an example collected image including traffic signs.

This disclosure provides techniques to use initial images including traffic signs to generate new images showing the traffic signs with physical changes. The physical changes can be, e.g., vegetation obscuring the traffic signs, graffiti on the traffic signs, bending of the traffic signs, removal of portions of the traffic signs, erasure of symbols on the traffic signs, corrosion of the traffic signs, etc. For example, an initial image can show a scene that includes an undamaged traffic sign captured by a camera on board a vehicle, and the techniques herein can be used to generate a new image (i.e., an artificial image) of the same scene with, e.g., a top half of the traffic sign bent downward. Specifically, a computer is programmed to receive a plurality of initial images including traffic signs, identify the traffic signs in the initial images, and generate new image by applying manipulations to the traffic signs in the initial images. The manipulations simulate the physical changes to the traffic signs. Because the new images are artificially generated, the vehicle does not need to travel roadways until encountering a traffic sign that is actually physically modified or altered, e.g., bent. Most traffic signs are in good condition, so using the techniques herein can be more efficient than operating a vehicle to physically inspect traffic signs. Further, a dataset of images with traffic signs in various conditions can be useful for training a machine-learning algorithm for tasks such as object recognition that can depend on interpreting details of objects such as the traffic signs.

A computer includes a processor and a memory, and the memory stores instructions executable by the processor to receive a plurality of initial images including traffic signs, identify the traffic signs in the initial images, and generate new images by applying manipulations to the traffic signs in the initial images. The manipulations simulate physical changes to the traffic signs.

In an example, the instructions may further include instructions to generate respective bounding boxes around the traffic signs in the initial images. In a further example, the manipulations to the traffic signs may be contained within the respective bounding boxes.

In an example, the manipulations may include a plurality of manipulation types, and the instructions to generate the new images may include instructions to apply the manipulations of different manipulation types to different subsets of the traffic signs in the initial images.

In an example, the physical changes may include vegetation obscuring the traffic signs.

In an example, the physical changes may include graffiti on the traffic signs.

In an example, the physical changes may include bending of the traffic signs.

In an example, the physical changes may include removal of portions of the traffic signs.

In an example, the physical changes may include erasure of symbols on the traffic signs.

In an example, the physical changes may include corrosion of the traffic signs.

In an example, the instructions to apply the manipulations may include instructions to, for one of the initial images, overlay a template on the respective traffic sign.

In an example, the instructions to apply the manipulations may include instructions to, for one of the initial images, apply a geometric transformation to a portion of the respective initial image containing the respective traffic sign.

In an example, the instructions to apply the manipulations may include instructions to, for at least one of the initial images, replace a first portion of the respective initial image containing the respective traffic sign with a second portion of the respective initial image not containing the respective traffic sign.

In an example, the instructions to apply the manipulations may include instructions to, for at least one of the initial images, change colors of a plurality of randomly selected pixels of a portion of the respective initial image containing the respective traffic sign.

In an example, the instructions further may include instructions to generate intermediate images by applying image-level manipulations to the initial images, the image-level manipulations simulating environmental conditions. In a further example, the new images may be first new images, and the instructions may further include instructions to generate second new images by applying the manipulations to the traffic signs in the intermediate images.

In an example, the instructions may further include instructions to train a machine-learning model on training data, and the training data includes the new images. In a further example, the machine-learning model may be an object-recognition model.

In another further example, the training data includes at least one of the initial images.

A method includes receiving a plurality of initial images including traffic signs, identifying the traffic signs in the initial images, and generating new images by applying manipulations to the traffic signs in the initial images. The manipulations simulate physical changes to the traffic signs.

With reference to the Figures, wherein like numerals indicate like parts throughout the several views, a computer 100 includes a processor and a memory, and the memory stores instructions executable by the processor to receive a plurality of initial images 200 including traffic signs 205, identify the traffic signs 205 in the initial images 200, and generate new images 300 by applying manipulations 305 to the traffic signs 205 in the initial images 200. The manipulations 305 simulate physical changes to the traffic signs 205.

With reference to FIG. 1, vehicles 105 may be used for collecting the initial images 200. The vehicles 105 may be any passenger or commercial automobile such as a car, a truck, a sport utility vehicle, a crossover, a van, a minivan, a taxi, a bus, etc.

The vehicles 105 can each include one or more cameras 110. The cameras 110 can detect electromagnetic radiation in some range of wavelengths. For example, the cameras 110 may detect visible light, infrared radiation, ultraviolet light, or some range of wavelengths including visible, infrared, and/or ultraviolet light. For example, the cameras 110 can be charge-coupled devices (CCD), complementary metal oxide semiconductors (CMOS), or any other suitable type. Alternatively or additionally, the initial images 200 may be captured by cameras 110 that are separate from vehicles 105.

The vehicles 105 can transmit images from the cameras 110 to the computer 100 via a network 115. The network 115 represents one or more mechanisms by which the computer 100 may communicate with a remote server. Accordingly, the network 115 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The computer 100 is a microprocessor-based computing device, e.g., a generic computing device including a processor and a memory. The memory of the computer 100 can include media for storing instructions executable by the processor as well as for electronically storing data and/or databases. The computer 100 can be multiple computers coupled together.

With reference to FIG. 2, the computer 100 can receive the initial images 200, either from one of the cameras 110 on board one of the vehicles 105 or from another source. Each initial image 200 (as well as each artificially generated new image 300) is a two-dimensional matrix of pixels. The initial images 200 and new images 300 can be color images. Each pixel can have a color represented as one or more numerical values, e.g., values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image, i.e., position in the field of view of the camera 110 for the initial images 200, can be specified in pixel dimensions or coordinates, e.g., an ordered pair of pixel distances, such as a number of pixels from a top edge and a number of pixels from a left edge of the field of view.

The computer 100 may be programmed to generate intermediate images by applying image-level manipulations to the initial images 200. For the purposes of this disclosure, an "image-level manipulation" is defined as an operation that is applied to an entirety of an area of an image. For example, the image-level manipulations may include rotating the initial images 200, mirroring the initial images 200, etc. The image-level manipulations may simulate environmental conditions, e.g., lighting, time of day, weather, speed of a camera capturing the image, etc. For example, the image-level manipulations may include brightening or darkening the image to simulate a different time of day than the initial image 200, e.g., by converting the initial image 200 from RGB (red-green-blue) to HSL (hue-saturation-lightness) and then adjusting the values in the L (lightness) channel for the pixels by a set amount. For another example, the image-level manipulations may include simulating rain by reducing a brightness of the initial image 200, applying a blur filter to the initial image 200, and/or adding simulated raindrops to the initial image 200. The simulated raindrops may be lines having pixel lengths randomly selected from a first range and pixel widths randomly selected from a second range, placed at a plurality of random pixels in the initial image 200 and oriented vertically. For another example, the image-level manipulations may include simulating fog by applying a blur filter to the initial image 200, with an intensity of the blur filter randomly adjusted at different regions of the initial image 200. For another example, the image-level manipulation may include simulating a sun flare by applying a blend filter between the initial image 200 and a circle of random pixel diameter that is placed at random pixel coordinates. For another example, the image-level manipulation may include simulating a speed blur on the image by convolving the initial image 200 with a unit diagonal matrix divided by the matrix's size.

The computer 100 may be programmed to segment each initial image 200, i.e., partition each initial image 200 into regions. For example, the computer 100 may execute a semantic segmentation algorithm. A semantic segmentation algorithm labels each pixel in an image with a category. The categories can be stored in the computer 100 as a list, e.g., {road, sidewalk, ground, trees, motor vehicle, bicycle, pedestrian, animal, building/wall, traffic sign, traffic light, sky}. The semantic segmentation algorithm can be a machine-learning algorithm, e.g., a deep neural network, a convolutional neural network, etc. One such machine-learning algorithm for performing semantic segmentation is Detectron2. For another example, the computer 100 may execute an instance segmentation algorithm. An instance segmentation algorithm divides an image into the distinct objects shown in the image. The instance segmentation algorithm can be a machine-learning algorithm, e.g., a deep neural network, a convolutional neural network, etc. For another example, the computer 100 may execute a panoptic segmentation algorithm, which is a combination of semantic segmentation and instance segmentation.

The computer 100 may be programmed to identify the traffic signs 205 in the initial images 200. For example, the computer 100 may identify the regions classified as "traffic signs" by the semantic segmentation algorithm as the traffic signs 205. For another example, the initial images 200 may come from a dataset that is annotated, and the computer 100 may identify the items in the initial images 200 that are labeled as "traffic signs" in the annotations as the traffic signs 205. For another example, the computer 100 can identify the traffic signs 205 using conventional image-recognition techniques, e.g., a convolutional neural network programmed to accept images as input and output an identified object. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of object, and the final output is the type with the highest score. The computer 100 identifies objects for which "traffic sign" is the highest-scoring type as the traffic signs 205. For another example, the computer 100 may use some combination of the foregoing, e.g., using annotations from initial images 200 that are annotated and using image-recognition on initial images 200 that lack annotations.

The computer 100 may be programmed to generate respective bounding boxes 210 around the traffic signs 205 in the initial images 200. Each bounding box 210 can be defined by, e.g., pixel coordinates of opposite corners of the bounding box 210. For example, the computer 100 may generate the bounding boxes 210 around the regions from the image segmentation that the computer 100 identified as traffic signs 205. The computer 100 may generate each bounding box 210 to be a minimum size encompassing the respective region, e.g., by using the highest and lowest vertical pixel coordinates and leftmost and rightmost horizontal pixel coordinates of the region to make the pairs of pixel coordinates for the bounding boxes 210.

With reference to FIGS. 3-8, the computer 100 is programmed to generate the new images 300 by applying the manipulations 305 to the traffic signs 205 in the initial images 200 (and/or the intermediate images). The manipulations 305 modify the initial images 200 by performing operations on the pixels of the initial images 200. The manipulations 305 may be localized, i.e., affecting only a portion of the initial image 200. The manipulations 305 to the traffic signs 205 may be contained within the respective bounding boxes 210.

Figure 3:
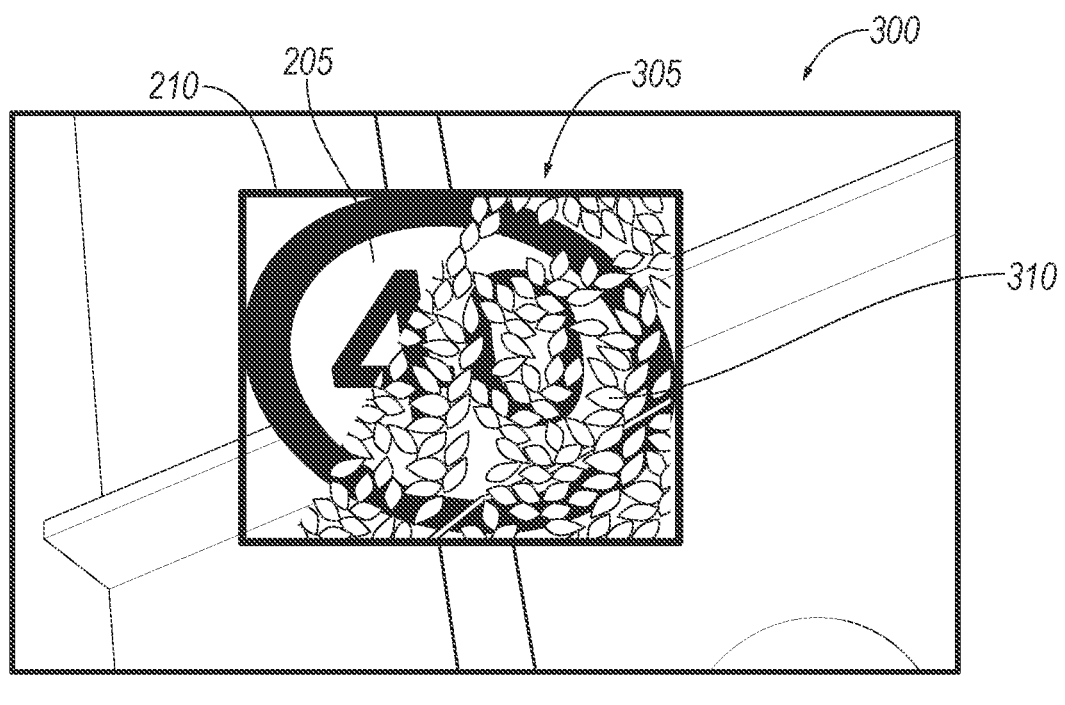
FIG. 3 is a representation of an example artificial image including a traffic sign with vegetation.
Figure 4:
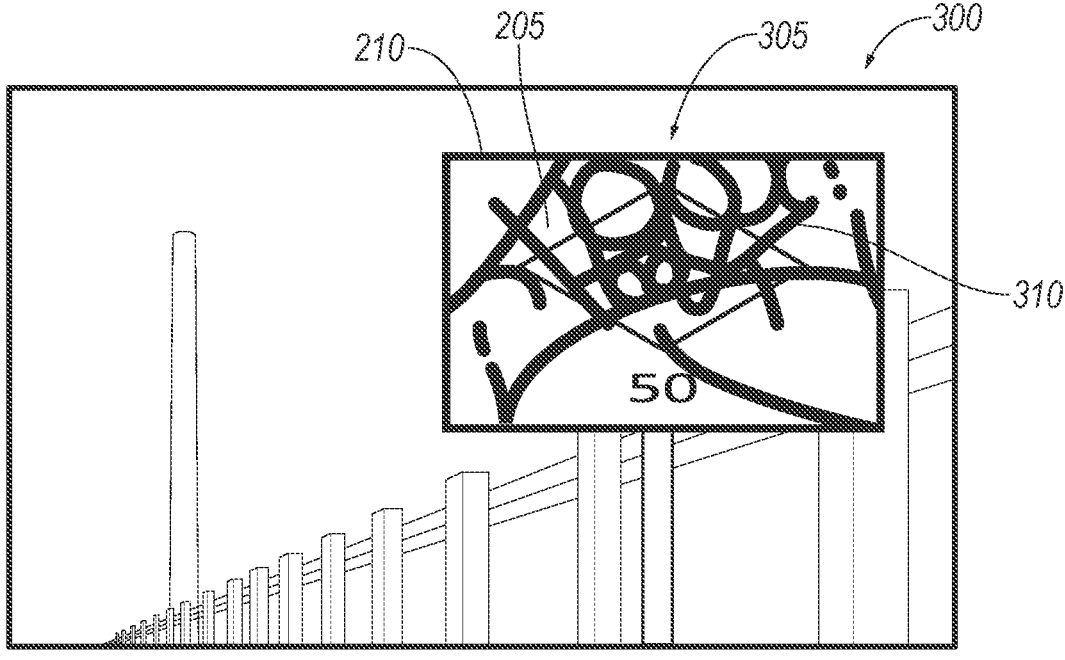
FIG. 4 is a representation of another example artificial image including a traffic sign with graffiti.
Figure 5:
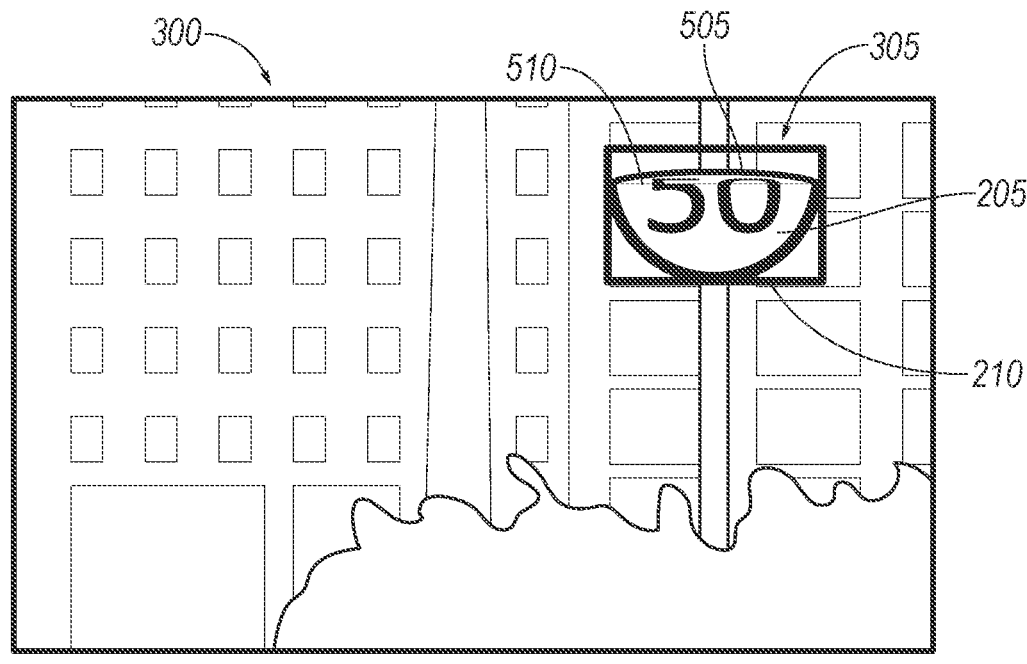
FIG. 5 is a representation of another example artificial image including a traffic sign with a bend.
Figure 6:
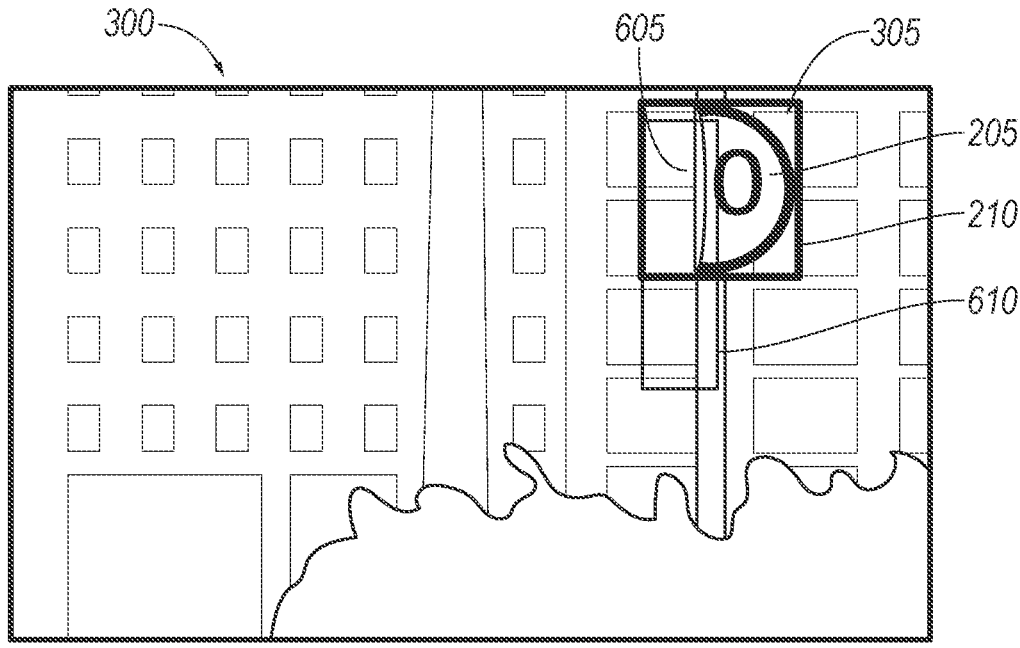
FIG. 6 is a representation of another example artificial image including a traffic sign with a portion removed.
Figure 7:
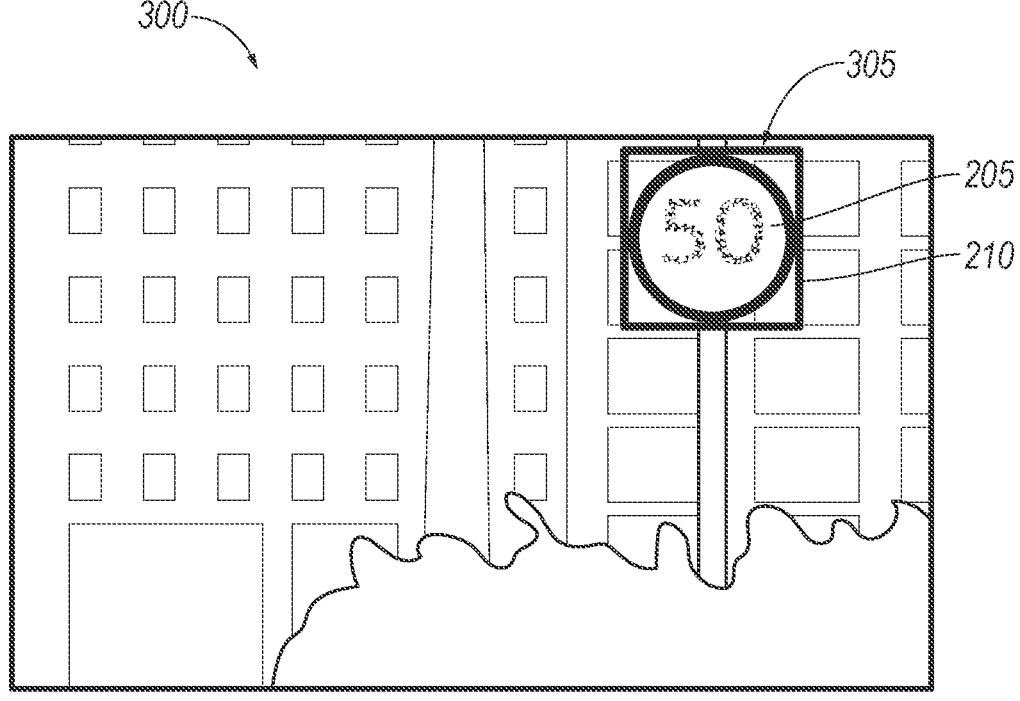
FIG. 7 is a representation of another example artificial image including a traffic sign with erasure of symbols.
Figure 8:
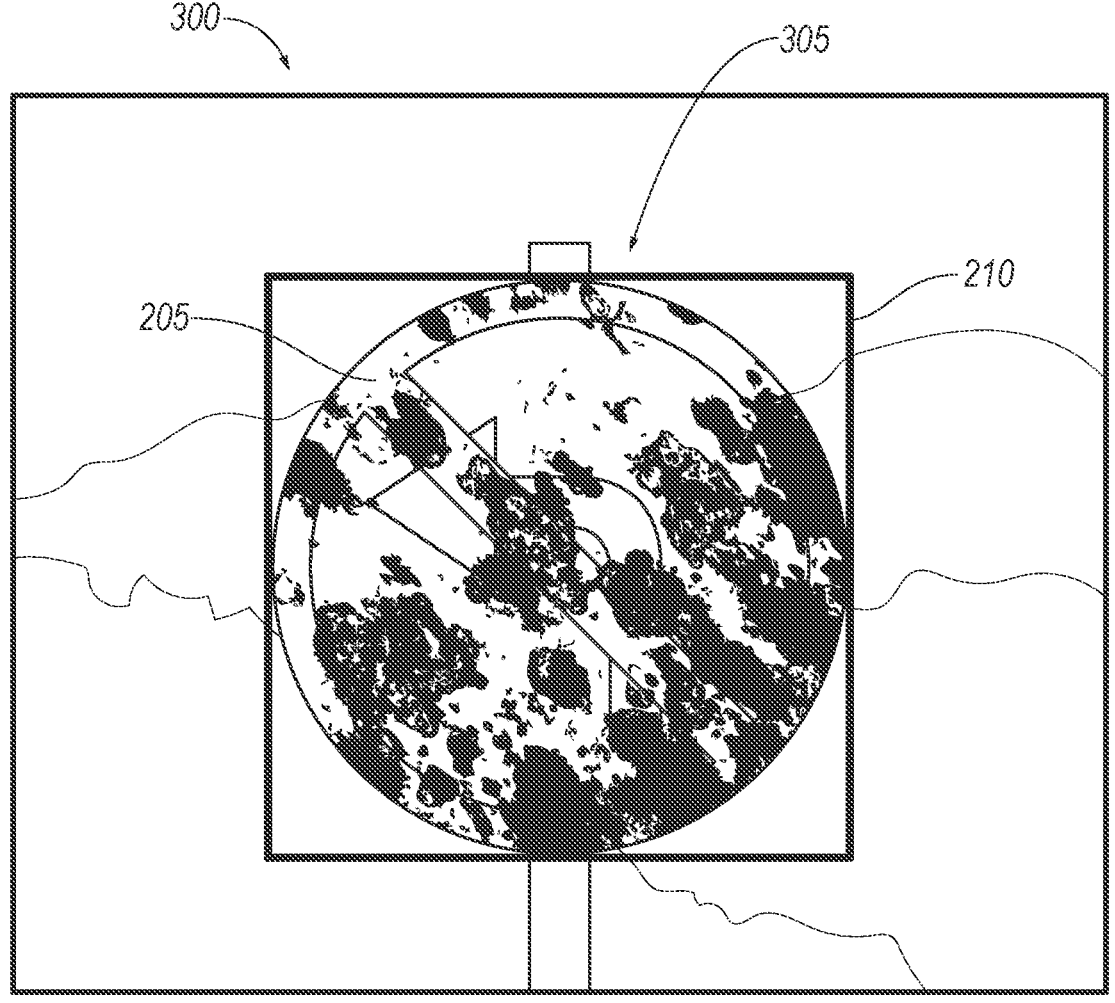
FIG. 8 is a representation of another example artificial image including a traffic sign with corrosion.

The manipulations 305 may include a plurality of manipulation types. Different manipulation types apply different operations to the pixels of the initial images 200. For example, the manipulation types may include overlaying templates 310 on the traffic signs 205, as shown in FIGS. 3 and 4; applying geometric transformations to portions of the initial images 200 containing the traffic signs 205, as shown in FIG. 5; replacing first portions 605 of the initial images 200 containing the traffic signs 205 with second portions 610 of the initial images 200 not containing the traffic signs 205, as shown in FIG. 6; and/or changing colors of a plurality of randomly selected pixels of portions of the initial images 200 containing the traffic signs 205, as shown in FIGS. 7 and 8. The computer 100 may apply the manipulations 305 of different manipulation types to different subsets of the traffic signs 205 in the initial images 200, resulting in a dataset of the new images 300 with multiple manipulation types applied to the traffic signs 205. The subsets may be chosen at random from the initial images 200, with a number of initial images 200 in each subset chosen to be sufficient for a machine-learning algorithm trained on the dataset of the new images 300 to recognize a traffic sign 205 with the respective physical change.

The manipulations 305 simulate physical changes to the traffic signs 205. The physical change is a change of the physical condition or constitution of the sign or the physical environment between the traffic sign 205 and the camera 110, starting from an unobstructed, like-new state. For example, the physical changes may include vegetation obscuring the traffic signs 205, as shown in FIG. 3; graffiti on the traffic signs 205, as shown in FIG. 4; bending of the traffic signs 205, as shown in FIG. 5; removal of portions of the traffic signs 205, as shown in FIG. 6; erasure of symbols on the traffic signs 205, as shown in FIG. 7; and/or corrosion of the traffic signs 205, as shown in FIG. 8.

With reference to FIGS. 3 and 4, for each initial image 200 in one of the subsets, the computer 100 may be programmed to generate a new image 300 by overlaying a template 310 on the respective traffic sign 205. The template 310 may simulate the physical change of vegetation obscuring the traffic sign 205, as shown in FIG. 3, or of graffiti on the traffic sign 205, as shown in FIG. 4. The template 310 includes pixels of specific colors as well as empty pixels representing the space between leaves and branches of the vegetation or between strokes of the graffiti. The memory of the computer 100 may store one or more libraries of the templates 310, e.g., a library of vegetation templates 310 and a library of graffiti templates 310. The libraries may each include templates 310 varying in different characteristics, e.g., density of coverage and vegetation type for the vegetation templates 310 or density of coverage, shape, and color for the graffiti templates 310. For each initial image 200, the computer 100 may select a template 310 at random from one of the libraries. The computer 100 may then resize the template 310, e.g., selecting pixel length and pixel height at random from respective ranges or matching the size of the template 310 to the size of the bounding box 210. The random selection of pixel length and pixel height may be used for the vegetation templates 310 to simulate the vegetation extending beyond the traffic sign 205. Matching the size of the bounding box 210 may be used for the graffiti templates 310 as graffiti is constricted to the surface of a traffic sign 205. The computer 100 then places the template 310 on the initial image 200, e.g., centered vertically and horizontally with respect to the bounding box 210. The pixels of specific colors of the template 310 replace the pixels of the initial image 200 at the same locations, and the empty pixels of the template 310 leave the pixels of the initial image 200 at the same locations unchanged.

With reference to FIG. 5, for each initial image 200 in one of the subsets, the computer 100 may be programmed to generate a new image 300 by applying a geometric transformation to a portion 505 of the initial image 200 containing the traffic sign 205. The geometric transformation may simulate bending of the traffic sign 205. The geometric transformation may be a transformation matrix, and the computer 100 may apply the transformation matrix to the portion 505 of the initial image 200, made up of pixels inside the bounding box 210. The portion 505 of the bounding box 210 may be preset and may be chosen based on a likely location of a bend to a traffic sign 205, e.g., a top half of the bounding box 210 as shown in FIG. 5. The transformation matrix may define changes in pixel coordinates for the pixels. The geometric transformation may be an affine transformation, which preserves lines and parallelism but not necessarily Euclidean distances and angles. For example, the locations of the pixels may be compressed along one axis of the initial image 200, e.g., the vertical axis as shown in FIG. 5. The pixels may be moved proportionally relative to a line 510 defining an edge of the portion 505 of the bounding box 210 being transformed, e.g., all the pixels may be moved downward to one-fourth of the previous distances from the line 510. A portion of the initial image 200 from outside the bounding box 210 may be copied to the space vacated by the pixels as a result of the geometric transformation, e.g., from a portion of the initial image 200 bordering the bounding box 210.

With reference to FIG. 6, for each initial image 200 in one of the subsets, the computer 100 may be programmed to generate a new image 300 by replacing a first portion 605 of the initial image 200 containing the traffic sign 205 with a second portion 610 of the initial image 200 not containing the traffic sign 205. The replacement of the first portion 605 with the second portion 610 may simulate removal of a portion of the traffic sign 205, e.g., that a portion of the traffic sign 205 broke off from the remainder of the traffic sign 205. The computer 100 may delete the pixels in the first portion 605 of the bounding box 210. The first portion 605 may be preset or randomly selected from a number of preset portions stored in the memory of the computer 100. As shown in FIG. 6, the first portion 605 is the left half of the bounding box 210. The second portion 610 may be from outside the bounding box 210, e.g., bordering the bounding box 210. In the example of FIG. 6, the second portion 610 was taken from directly below the first portion 605 of the bounding box 210. Using a second portion 610 bordering the bounding box 210 can help the area where the traffic sign 205 was removed resemble the background behind the traffic sign 205, e.g., in the example of FIG. 6, by copying a pole and building behind the traffic sign 205. The second portion 610 has the same pixel dimensions as the first portion 605. The computer 100 copies the second portion 610 onto the area occupied by the first portion 605.

With reference to FIGS. 7 and 8, for each initial image 200 in one of the subsets, the computer 100 may be programmed to generate a new image 300 by changing colors of a plurality of randomly selected pixels of a portion of the initial image 200 containing the traffic sign 205. The color changes may simulate erasure of symbols on the traffic signs 205, as shown in FIG. 7, or corrosion of the traffic signs 205, as shown in FIG. 8. The randomly selected pixels may be taken from the bounding box 210. The randomly selected pixels may constitute a preset proportion of the pixels in the bounding box 210, e.g., one fourth. For erasure of the symbols, the computer 100 may identify a background color of the traffic sign 205, e.g., as the color with the largest number of pixels in the bounding box 210. The computer 100 may then change the randomly selected pixels to the background color. For corrosion, the computer 100 may change the pixels to one or more hues of brown chosen to be typical of corrosion. Alternatively, to simulate corrosion, the computer 100 may overlay a template 310 depicting corrosion on the traffic sign 205 in the manner described above with respect to FIGS. 3 and 4.

Figure 9:
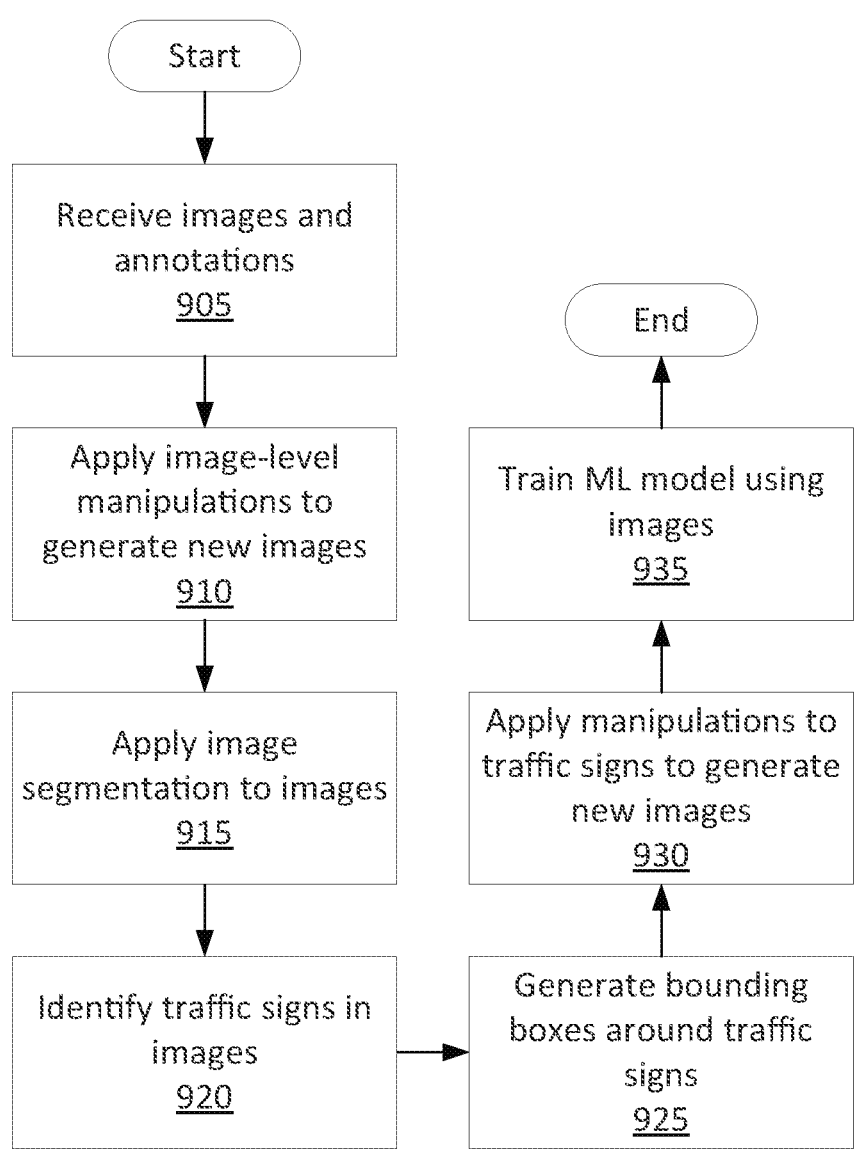
FIG. 9 is a flowchart of an example process for generating the artificial images.

FIG. 9 is a process flow diagram illustrating an example process 900 for generating the new images 300. The memory of the computer 100 stores executable instructions for performing the steps of the process 900 and/or programming can be implemented in structures such as mentioned above. As a general overview of the process 900, the computer 100 receives the initial images 200 and annotations, generates the intermediate images by applying the image-level manipulations to some of the initial images 200, segments the initial images 200 and/or the intermediate images, identifies the traffic signs 205 in the initial images 200 and/or the intermediate images, generates the bounding boxes 210 around the traffic signs 205 in the initial images 200 and/or the intermediate images, generates the new images 300 by applying the manipulations 305 to the traffic signs 205 in the initial images 200 and/or the intermediate images, and trains a machine-learning model on training data including the new images 300.

The process 900 begins in a block 905, in which the computer 100 receives the initial images 200 including the traffic signs 205, as well as the annotations if any.

Next, in a block 910, the computer 100 generates the intermediate images by applying image-level manipulations to a subset of the initial images 200, as described above.

Next, in a block 915, the computer 100 segments the initial images 200 and/or the intermediate images, as described above.

Next, in a block 920, the computer 100 identifies the traffic signs 205 in the initial images 200 and/or the intermediate images, as described above.

Next, in a block 925, the computer 100 generates respective bounding boxes 210 around the traffic signs 205 in the initial images 200 and/or the intermediate images.

Next, in a block 930, the computer 100 generates the new images 300 by applying the manipulations 305 to the traffic signs 205 in the initial images 200 and/or the intermediate images, as described above.

Next, in a block 935, the computer 100 trains a machine-learning model on training data that includes the new images 300. The machine-learning model may be an object-recognition model, e.g., using a convolutional neural network. The training data includes the new images 300. The training data may further include the initial images 200 and/or the intermediate images. Once trained, the machine-learning model may be installed on a vehicle computer of a vehicle 105, and the vehicle computer may be programmed to actuate the vehicle 105 based on classifications outputted by the machine-learning model, e.g., by actuating one or more of a propulsion system, a brake system, and/or a steering system of the vehicle 105. For example, the vehicle computer may use the classification of an object as a particular type of traffic sign 205 to operate the vehicle 105 in accordance with the traffic sign 205, e.g., actuating the brake system to stop the vehicle 105 for a stop sign, actuate the propulsion system to propel the vehicle 105 at a speed selected based on a speed limit sign, etc. Because of different physical conditions of the traffic signs 205 in a training data set including both the new images 300 and the initial images 200, the machine-learning model may classify traffic signs 205 accurately in a greater variety of conditions of the traffic signs 205, thereby assisting the autonomous operation of the vehicle 105. After the block 935, the process 900 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   receive a plurality of initial images including traffic signs;
   identify the traffic signs in the plurality of initial images;
   generate a plurality of new images by applying manipulations to the traffic signs in the plurality of initial images, the manipulations simulating physical changes to the traffic signs, the physical changes including at least one of vegetation spaced between the respective traffic sign and a camera recording the respective initial image, graffiti on the traffic signs, physical bending of the traffic signs limited to subparts of the initial images including the traffic signs, erasure of symbols on the traffic signs limited to the subparts of the initial images including the traffic signs, or corrosion of the traffic signs limited to the subparts of the initial images including the traffic signs; and
   train a machine-learning model on training data, wherein the training data includes the plurality of new images;
   wherein the instructions to apply the manipulations include instructions to, for one of the plurality of initial images, at least one of overlay a template on the respective traffic sign, apply a geometric transformation to a first portion of the respective initial image containing the respective traffic sign, or replace the first portion of the respective initial image containing the respective traffic sign with a second portion of the respective initial image not containing the respective traffic sign.

2. The computer of claim 1, wherein the instructions further include instructions to generate respective bounding boxes around the traffic signs in the plurality of initial images.

3. The computer of claim 2, wherein the manipulations to the traffic signs are contained within the respective bounding boxes.

4. The computer of claim 1, wherein the manipulations include a plurality of manipulation types, and the instructions to generate the plurality of new images include instructions to apply the manipulations of different manipulation types to different subsets of the traffic signs in the plurality of initial images.

5. The computer of claim 1, wherein the physical changes include vegetation spaced between the respective traffic sign and a camera recording the respective initial image.

6. The computer of claim 1, wherein the physical changes include graffiti on the traffic signs.

7. The computer of claim 1, wherein the physical changes include physical bending of the traffic signs limited to the subparts of the initial images including the traffic signs.

8. The computer of claim 1, wherein the physical changes include removal of portions of the traffic signs.

9. The computer of claim 1, wherein the physical changes include erasure of symbols on the traffic signs limited to the subparts of the initial images including the traffic signs.

10. The computer of claim 1, wherein the physical changes include corrosion of the traffic signs limited to the subparts of the initial images including the traffic signs.

11. The computer of claim 1, wherein the instructions to apply the manipulations include instructions to, for one of the plurality of initial images, overlay the template on the respective traffic sign.

12. The computer of claim 1, wherein the instructions to apply the manipulations include instructions to, for one of the plurality of initial images, apply the geometric transformation to the first portion of the respective initial image containing the respective traffic sign.

13. The computer of claim 1, wherein the instructions to apply the manipulations include instructions to, for at least one of the plurality of initial images, replace the first portion of the respective initial image containing the respective traffic sign with the second portion of the respective initial image not containing the respective traffic sign.

14. The computer of claim 1, wherein the instructions to apply the manipulations include instructions to, for at least one of the plurality of initial images, change colors of a plurality of randomly selected pixels of the first portion of the respective initial image containing the respective traffic sign.

15. The computer of claim 1, wherein the instructions further include instructions to generate a plurality of intermediate images by applying image-level manipulations to the plurality of initial images, the image-level manipulations simulating environmental conditions.

16. The computer of claim 15, wherein the plurality of new images is a plurality of first new images, and the instructions further include instructions to generate a plurality of second new images by applying the manipulations to the traffic signs in the plurality of intermediate images.

17. The computer of claim 1, wherein the machine-learning model is an object-recognition model.

18. The computer of claim 1, wherein the training data includes at least one of the plurality of initial images.

19. A method comprising:

receiving a plurality of initial images including traffic signs;

identifying the traffic signs in the plurality of initial images;

generating a plurality of new images by applying manipulations to the traffic signs in the plurality of initial images, the manipulations simulating physical changes to the traffic signs, the physical changes including at least one of vegetation spaced between the respective traffic sign and a camera recording the respective initial image, graffiti on the traffic signs, physical bending of the traffic signs limited to subparts of the initial images including the traffic signs, erasure of symbols on the traffic signs limited to the subparts of the initial images including the traffic signs, or corrosion of the traffic signs limited to the subparts of the initial images including the traffic signs; and training a machine-learning model on training data, wherein the training data includes the plurality of new images;

wherein the instructions to apply the manipulations include instructions to, for one of the plurality of initial images, at least one of overlay a template on the respective traffic sign, apply a geometric transformation to a first portion of the respective initial image containing the respective traffic sign, or replace the first portion of the respective initial image containing the respective traffic sign with a second portion of the respective initial image not containing the respective traffic sign.

20. A computer comprising a processor and a memory, the memory storing instructions executable by the processor to:

receive a plurality of initial images including traffic signs;

identify the traffic signs in the plurality of initial images;

generate a plurality of new images by applying manipulations to the traffic signs in the plurality of initial images, the manipulations simulating physical changes to the traffic signs, the physical changes including at least one of vegetation spaced between the respective traffic sign and a camera recording the respective initial image, graffiti on the traffic signs, physical bending of the traffic signs limited to subparts of the initial images including the traffic signs, erasure of symbols on the traffic signs limited to the subparts of the initial images including the traffic signs, or corrosion of the traffic signs limited to the subparts of the initial images including the traffic signs; and train a machine-learning model on training data, wherein the training data includes the plurality of new images;

wherein the physical changes include corrosion of the traffic signs limited to the subparts of the initial images including the traffic signs.

* * * * *